(12) United States Patent
Yoshizawa

(10) Patent No.: US 6,361,101 B1
(45) Date of Patent: Mar. 26, 2002

(54) LAMINATED GLASS AND WINDOW USING THE SAME

(75) Inventor: Hideo Yoshizawa, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/166,447

(22) Filed: Oct. 5, 1998

(30) Foreign Application Priority Data

Oct. 7, 1999 (JP) .............................................. 9-274634

(51) Int. Cl.$^7$ .................................................. B60J 1/00
(52) U.S. Cl. ..................... 296/190.1; 296/200; 428/213; 428/337; 428/409; 428/410; 428/426; 428/437
(58) Field of Search ................................. 428/409, 410, 428/426, 437, 428, 332, 212, 220, 215, 337, 213; 52/786.12; 296/200, 190.1, 146.1, 146.15

(56) References Cited

U.S. PATENT DOCUMENTS

| 3,282,772 A | * | 11/1966 | Davis, Sr. .................... 161/165 |
| 3,427,770 A | * | 2/1969 | Kunert et al. .................. 52/203 |
| 3,505,160 A | * | 4/1970 | Michaels et al. ............ 161/147 |
| 3,574,045 A | * | 4/1971 | Mould ......................... 161/164 |
| 3,592,726 A |   | 7/1971 | Blizard ........................ 428/215 |
| 3,630,812 A | * | 12/1971 | Bruckner et al. ............ 161/139 |
| 3,900,673 A | * | 8/1975 | Mattimore et al. ......... 428/339 |
| 4,124,733 A |   | 11/1978 | Melling et al. .............. 428/212 |
| 4,776,132 A | * | 10/1988 | Gold ............................. 49/375 |

FOREIGN PATENT DOCUMENTS

| DE | 27 58 581 | 5/1979 |
| EP | 418123 A | * 3/1991 |
| FR | 2 346 301 | 10/1977 |
| GB | 2 011 316 A | 7/1979 |

* cited by examiner

Primary Examiner—Deborah Jones
Assistant Examiner—Stephen Stein
(74) Attorney, Agent, or Firm—Merchant & Gould P.C.

(57) ABSTRACT

A laminated glass comprises a tempered first glass sheet, in which by breaking the glass sheet at one point, cracks spread spontaneously so that a crack-network is formed, and a second glass sheet. The second glass sheet has a lower strength than the first glass sheet, or such a thickness and a strength that the second glass sheet can be easily broken on the side of the first glass. Such a laminated glass can reduce the difficulty in escaping from the interior of an automobile sunk in water or the like.

11 Claims, 6 Drawing Sheets

LAMINATED GLASS AND WINDOW USING THE SAME

FIELD OF THE INVENTION

The present invention relates to a laminated glass and a window, and more particularly to a vehicle window in which the escape through the window in case of emergency is considered.

BACKGROUND OF THE INVENTION

Recently, public attention has been paid to the fact that not a few people are killed in automobile accidents in which automobiles fall into the sea, rivers, reservoirs, lakes and the like. For example, in Japan, 200 to 250 people lose their lives every year in automobiles sunk in water as reported in an article of the morning edition of the Osaka Yomiuri of Jul. 5, 1997.

As described in this article, an automobile can usually float on water for several minutes when falling into the sea or the like. The driver and passengers in the automobile have to escape while the automobile is still on the surface of the water. However, the doors of the automobile partially subjected to the external water pressure (the water pressure reaches as high as about 100 kgf) cannot be easily pushed open. The occupants trying to escape by opening a window often find an electrically powered window inoperative due to the entrance of water. Furthermore, for an automobile glass, the use of a tempered glass sheet or a laminated glass sheet which are not easily broken by hand alone is mandatory to ensure the safety of the people in the automobile in case of an automobile crash or the like.

Thus, in order to obtain an escape route by cracking a window glass in case of emergency, it is recommended to keep a hammer for breaking glass in an automobile. In Japan, sales of such hammers at automobile equipment stores have increased, partially because the Ministry of Transport announced their necessity.

A hammer for breaking glass comprises a special pointed steel part at its tip and is used to provide an escape route for the occupants in an automobile by utilizing the properties of a tempered glass sheet. A tempered glass sheet produced by heat-treatment of a glass sheet is different from the normal glass sheet in breaking. When a blunt object such as a human head hits a tempered glass sheet, it is broken less easily than a normal glass sheet in an untreated state due to a compressive stress layer in the surface of the tempered glass sheet. The compressive stress layer inhibits small cracks in the surface from growing. However, once cracks in the surface extend to the inside by using a keen member such as the tip of the hammer for breaking glass, the cracks propagate spontaneously over the tempered glass due to an internal tensile stress, so that the glass can be easily broken. The heat-treatment for tempering causes not only the compressive stress in the surface but also the tensile stress under the surface.

On the other hand, like tempered glass, a laminated glass also is widely used as an automobile window glass. Generally, the laminated glass comprises two non-tempered glass sheets bonded with a plastic intermediate film such as PVB (polyvinyl butyral resin). The laminated glass provides excellent safety in that when a human body hits the glass, the glass itself cracks and is deformed while preventing the human body from being thrown out, thus averting injuries to the human body with the broken pieces of the glass and an excessive impact on the human head. The safety is caused by the flexible intermediate film holding the glass sheets or the broken pieces of the glass sheets.

However, the excellent property of the laminated glass provided by the combination of the intermediate film and the glass sheets makes the demolition of the window glass in a short time difficult. Even if the hammer for breaking glass is used, it is not easy to escape through a window in which a conventional laminated glass is fitted. In commercially available automobiles, a laminated glass is used for a windshield, while for other windows such as side windows tempered glass sheets are generally used. However, the use of a laminated glass for the other windows is expected to increase because of its excellent function in safety.

SUMMARY OF THE INVENTION

Therefore, it is an object of the present invention to provide a laminated glass that can reduce difficulties in escaping from the interior of an automobile or the other vehicles and an automobile window that reduces the difficulty of the escape.

In order to achieve the above object, an embodiment of the laminated glass of the present invention comprises a first glass sheet, a second glass sheet and an intermediate film for bonding the glass sheets. The first glass sheet is a tempered glass in which, by breaking the first glass sheet at one point, cracks spread spontaneously from the point so that a crack-network is formed in the first glass sheet. On the other hand, the second glass sheet has a lower strength than the first glass sheet.

According to the laminated glass, the difficulty in escaping from the interior of a vehicle such as an automobile can be reduced. The first glass sheet is a tempered glass sheet in which by breaking the glass sheet at one point with a hammer for breaking glass or the like, cracks can run spontaneously while breaking up into some branches, so that the cracks form a mesh-like pattern and the glass sheet is easy to be broken into many pieces. The second glass sheet has a relatively low strength, so that the difficulty of breaking through the intermediate film is reduced. After dividing the first glass sheet into many small pieces, the difficulty in breaking the second glass sheet through the intermediate film can be reduced further.

In such a laminated glass, it is preferred that the second glass sheet is not subjected to heat-treatment for tempering to such an extent that cracks run spontaneously when breaking the glass sheet at one point. More preferably, the second glass sheet is a non-tempered glass sheet. When the second glass sheet has a thickness of 1.5 to 3.2 mm, the difficulty of the demolition through the intermediate film can be further reduced. Herein, the non-tempered glass sheet includes all glass sheets except for tempered glass sheets wherein a compressive stress layer is formed on the surface by heating the glass sheet to around its softening point and quenching it. A tempered glass sheet usually has a strength three to five times that of the glass sheet before tempering.

Another embodiment of the laminated glass of the present invention comprises a first glass sheet, a second glass sheet and an intermediate film for bonding the glass sheets, and the laminated glass satisfies the following equations:

$$F_1 \geq -8.5(t_1-2.0)+55,$$

$$2.0 \leq t_1 \leq 4.0,$$

$$F_2 \leq -9.41(t_2-1.5)+44,$$

and $$1.5 \leq t_2 \leq 3.2,$$

wherein $t_1$ [mm] is the thickness of the first glass sheet, $F_1$ [MPa] is the residual tensile stress in a cross-sectional center of the first glass sheet, $t_2$ [mm] is the thickness of the second glass sheet, and $F_2$ [MPa] is the residual tensile stress in a cross-sectional center of the second glass sheet.

According to such a laminated glass, the difficulty in escaping from the interior of a vehicle such as an automobile can be reduced. The above formulae were found as a result of various experiments based on a novel viewpoint that the thickness of the glass sheets and the relationship between the thickness and the internal stress are the primary factors to be considered for reducing difficulties in escaping from the interior of a vehicles.

Still another embodiment of the laminated glass of the present invention comprises a first glass sheet, a second glass sheet and an intermediate film for bonding the glass sheets. The first glass sheet is a tempered glass in which, by breaking the first glass sheet at one point, cracks spread spontaneously from the point so that a crack-network is formed in the first glass sheet. In the laminate glass, an edge of the first glass sheet protrudes over an edge of the second glass sheet.

According to the laminated glass, the difficulty in escaping from the interior of a vehicle such as an automobile or the like can be reduced. The first glass sheet is a tempered glass sheet in which by breaking the glass sheet at one point with a hammer for breaking glass or the like, cracks can run spontaneously while breaking up into some branches, so that the cracks form a mesh-like pattern and the glass sheet is easily to be broken into many pieces. Furthermore, due to the protrusion of an edge of the first tempered glass sheet from the edge of the laminated glass, window frame members can be supported mainly with the tempered first glass sheet that can be easily broken by the hammer or the like.

In the specification, a crack-network means a pattern of cracks in which there are cracks (secondary cracks) extending between and connecting other cracks such as primary crack extending from the breakage point. The crack-network preferably divides the glass sheet into many pieces.

An embodiment of the window of the present invention comprises one of the laminated glasses as described above. In such a window, the first glass sheet preferably faces the interior side, while the second glass sheet faces the exterior side.

It is preferred that the laminated glass is supported substantially only with the first glass sheet at least in a part of a peripheral portion of the laminated glass.

According to such a window, the laminated glass is easily dropped out of the window frame members by breaking only the tempered glass sheet facing the interior side, so that the difficulty of the escape from the window of a vehicle such as an automobile can be further reduced.

DISCRIPTION OF THE PREFERRED EMBODIMENT (First Embodiment)

A laminated glass illustrated as the first embodiment comprises a first glass sheet that is subjected to a tempering treatment, a second glass sheet that is not tempered or tempered less than the first glass sheet if subjected to the tempering treatment, and a plastic intermediate film interposed between these glass sheets for bonding them. In an embodiment of the window of the present invention, this laminated glass is supported by a window frame member so that the first glass sheet faces the interior side and the second glass sheet faces the exterior side.

In order to escape to the outside by breaking a window in which such a laminated glass is fitted, first, the first glass sheet is broken with a tool having a sharp metal member, such as a hammer for breaking glass. Second, the second glass sheet is broken through the broken first glass sheet and the plastic intermediate film. Third, the plastic intermediate film is pushed to deform the laminated glass so as to drop it out of the window frame.

In order to remove the laminated glass easily according to such a procedure, the first glass sheet is tempered to such an extent that when the glass sheet is broken at one point on the surface of its exposed portion that is not inserted in the window frame in practical use, cracks can run spontaneously from the point of fracture to form a network. The glass sheet that can be broken into small pieces only by fracture at one point is favorable for the escape in case of emergency.

For cracks to spread with a mesh-like pattern only by breaking the glass at one point, it is required that the glass comprises an inside residual tensile-stress layer having a predetermined value or more. The cracks formed to reach the residual tensile-stress layer from the surface of the glass sheet run spontaneously in the surface due to the tensile stress. There is an upper limit for the propagation speed of the cracks. Therefore, the cracks run with branching and form a network when a stress accelerates the propagation speed of the cracks to above the upper limit. The cracks initiating from the fracture point preferably grow substantially over the entire glass sheet from the point.

More preferably, the first glass sheet is tempered so that the size of the broken pieces of the glass is reduced to such an extent that the demolition of the second glass sheet is not impeded. The size of the broken pieces is such that the number of the broken pieces per unit area is not less than about 5 pieces/50 mm×50 mm. For example, the size can be investigated according to Japanese Industrial Standard (JIS) R 3212 (1992) "fracture test".

There is no upper limit of the tempering degree of the first glass sheet, and the maximum stress that can be present in the glass sheet may be used. However, to achieve an extreme increase of the tempering degree, it is necessary that the glass sheet is heated to a higher temperature or cooled very rapidly. When the glass sheet is heated to an excessively high temperature, the glass sheet may not have a sufficient transparency property. Therefore, it is preferred that the glass sheet is tempered to such an extent that it can pass a predetermined transparency strain test such as JIS R 3211 (1992) that puts restrictions on safety glass for automobiles. On the other hand, when the glass sheet is cooled excessively, the glass is broken easily during cooling. Therefore, such cooling is not preferred for commercial manufacture.

The thickness of the first glass sheet is preferably in the range of 2.0 mm to 4.0 mm. With a thickness of less than 2.0 mm, a tempered glass in which cracks spread over the entire glass sheet cannot be easily manufactured. With a thickness of more than 4.0 mm, the glass sheet is too heavy for an automobile window glass, for example, and such a glass sheet is, in some cases, too thick for other applications, causing difficulties in positioning it in a frame.

For the second glass sheet, it is difficult to use the metal member of a hammer for breaking glass directly on the second glass sheet during the escape, because the plastic intermediate film presents an obstacle. Therefore, the second glass sheet is arranged to have such a strength that the second glass sheet can be broken through the obstacle. Thus, the second glass sheet has a lower strength than the first glass sheet. Although the second glass sheet may be subjected to a tempering treatment as long as difficulties are not caused, the second glass sheet is preferably a non-tempered glass sheet.

The thickness of the second glass sheet is preferably in the range of 1.5 mm to 3.2 mm. With a thickness of less than 1.5 mm, the strength required of the glass sheet in its normal use decreases. With a thickness of more than 3.2 mm, the laminated glass sheet becomes thicker and heavier than necessary, and such a thickness also is not preferred in view of the fracture through the intermediate film.

The compositions of the glass sheet and the intermediate film that can be used are not limited to specific compositions. Conventional compositions can be used without specific limitations. For example, a clear or tinted soda-lime silicate glass can be used as the window glass. An organic polymer film is usually used as the intermediate film. For example, a film of PVB, EVA (ethylene-vinyl acetate copolymer) or the like can be used.

The glass sheets are individually subjected to an edge processing, a perforating processing, a surface printing processing, and the like as required before a lamination processing. At least a glass sheet for the first glass sheet is subjected to a tempering treatment. As the tempering treatment, a so-called thermal tempering (physical tempering) treatment is usually used. In such a treatment, a glass sheet is heated to a temperature of around its softening point (preferably, a temperature between its strain point and its softening point) and quenched so as to form a compressive-stress layer in the surface and a tensile-stress layer in the center portion of the glass sheet. The degree of tempering the glass sheet can be adjusted, for example, by the quenching speed, specifically, by the blowing pressure of the cooling gas blown to the glass sheet for quenching. Also, by incorporating a bending treatment into this treatment, the glass sheet becomes a bent and tempered glass sheet. A bending treatment in which a heated glass sheet is pressed with a pair of dies and a bending treatment utilizing the self-weight of a glass sheet softened by heating (sag bending) does not cause difficulties in carrying out the present invention.

The pair of the glass sheets and the intermediate film are processed to form a laminated glass. This processing is not particularly limited, but usually comprises a pre-press process for reducing the amount of air that remains between the glasses and autoclaving (a permanent adhesion process using an autoclave).

The laminated glass thus manufactured is fitted into a window preferably so that the tempered first glass sheet faces the interior side while the second glass sheet faces the exterior side. The way to install the laminated glass by window frame members is not limited to a specific method. In an automobile window, for example, the edges of the laminated glass may be inserted in and held by window frame members made of an elastic body, such as gaskets and weather strips, as in a regular automobile window. The laminated glass may be inserted deep in a window frame in a portion having a space margin, such as the lower edge of a side door window, and fixed inside the window frame.

(The Second Embodiment)

A laminated glass illustrated as the second embodiment comprises a first glass sheet subjected to a tempering treatment, a second glass sheet that is not tempered or subjected to the tempering treatment, and a plastic intermediate film interposed between these glass sheets for bonding.

This laminated glass is different from the laminated glass illustrated in the first embodiment in that the strength of the second glass sheet is not limited to a specific strength and that the second glass sheet may be tempered to the same degree as the first glass sheet. Also, in this laminated glass, the first glass sheet is preferably larger than the second glass sheet, and the laminated glass has an edge with a step structure in which an edge of the first glass sheet protrudes over an edge of the second glass sheet. Such a step structure may be provided for all edges of the laminated glass or only a part of the edges.

By utilizing the step structure of the edge, only the first glass sheet is substantially supported at least in a part of an edge of the laminated glass by the window frame member. This support method is not particularly limited, but for example, only the first glass sheet may be fitted in and fixed to the concave portion of the window frame member such as a weather strip. Also, in a glass-opening window that is often found as an automobile side door window, the window frame member for guiding an edge of the ascending and descending window glass may guide only an edge of the first glass sheet, or the internal device for raising and lowering the glass sheets and only the first glass sheet may be connected and fixed to each other.

In this case, it is not always necessary that the first glass sheet is supported at all the edges of the laminated glass. The above step structure can be provided to the edge for reducing the difficulties in escaping by breaking the laminated glass, which can be properly determined according to the shape of the window glass, the capability of opening and closing, and the like. Utilizing this step structure, only the first glass sheet of the laminated glass has to be substantially supported by the window frame. The method for supporting the first glass sheet is not particularly limited. Other than with the weather strips, the first glass sheet may also be fixed with bolts or the like by forming through-holes in the glass sheet and utilizing these holes.

Also, it is not necessary that strictly, only the first glass sheet is supported at such an edge. The object of the present invention is achieved if, after cracks spread and reach the edges of the glass by breaking the first glass sheet, the edges of the laminated glass drop out of the window frame members by pushing the laminated glass on the first glass sheet side. For example, an edge of the second glass sheet also may be supported by the window frame member so that the laminated glass drops if the first glass sheet is broken (so that the laminated glass cannot be held only by the second glass sheet). Specifically, the laminated glass may be arranged so that the first glass sheet is inserted in the concave portion of a gasket or the like at its full depth and the second glass sheet is inserted shallowly so that the second glass sheet easily drops out of the recess portion if the first glass sheet is broken.

The laminated glass in this embodiment can be manufactured by the method illustrated in the first embodiment.

EXAMPLE

Example 1

First, the relationship between the tempering degree of glass sheets and the growth of cracks was examined according to the following procedure. For the glass sheets used for the examination, a soda-lime silica glass (float glass) sheet having a thickness of 2.3 mm was cut to a size of 500 mm by 750 mm. These glass sheets were turned into tempered glasses having various tempering degrees using a furnace for bending and quenching glass. The furnace for bending and quenching glass comprises a heating furnace and a quenching device. In the heating furnace, the glass sheet was heated while being carried on an air bed, and the softened glass sheet was bent along the shape of the air bed by the self-weight of the glass sheet. Then, the glass sheet was carried into the quenching device, quenched by blowing a cooling gas (air), and tempered. The bending was a single-dimensional bending in which the 500 mm width had a curvature of 1300 mmR.

The bent and tempered glass sheet was put on a support having the same shape as the surface of this glass sheet, and supported by and fixed to the support. The glass sheet was broken by pushing a "punch" (a tool for breaking glass) against substantially the center portion of the surface of the glass sheet. For a glass sheet having a low tempering degree, several cracks extended only radially from the breakage point. It was confirmed that as the tempering degree increased, the number of cracks increased. However, even if the number of cracks increased to about 26 to 30, secondary cracks, which connect the primary cracks extending radially, and the phenomenon of mesh-like propagation of cracks could not be observed.

When such a glass is used to make a laminated glass and fitted in a window, it is not easy to escape by breaking the laminated glass, even by breaking the laminated glass with a hammer for breaking glass, because the edge of each broken piece of the glass is inserted in and held by the glass frame. Specifically, in the laminated glass, the intermediate film holds each broken piece of the glass by adhesion, causing difficulties in escaping in case of emergency if each broken piece is supported by the frame. Therefore, the tempering degree of the glass sheet was further increased. When a tempered glass having a higher tempering degree was broken, secondary cracks occurred, so that each broken piece of the glass was divided into granular pieces. The size of these granular broken pieces tended to decrease as the tempering degree increased.

For the broken piece of the glass after fracture, the residual tensile stress of its cross-sectional center portion was measured with a polarizing microscope. A broken piece whose optical path length is in the range of 5 to 10 mm was used. This measurement method requires actually breaking the glass sheet, but it can evaluate the stress relatively accurately. The relationship between the magnitude of such a residual tensile stress and the growth of cracks was examined for glass sheets having thicknesses of 2.0 to 4.0 mm. The lower limit of the internal tensile stress (residual central tensile stress) required for producing a crack-network was 55 MPa for a thickness of 2.0 mm and 38 MPa for a thickness of 4.0 mm, and was approximately linear with values between 55 MPa and 38 MPa for thicknesses of 2.0 to 4.0 mm. For a tempered glass sheet that is manufactured to satisfy these conditions and whose broken pieces are small enough to be preferable in the case of escape, the number of the broken pieces was counted according to item 3.3 "fracture test" of JIS R 3212 (1992), a method for testing automobile safety glass. The number was 5.5 pieces/50 mm×50 mm at the coarsest portion.

Figure 2:
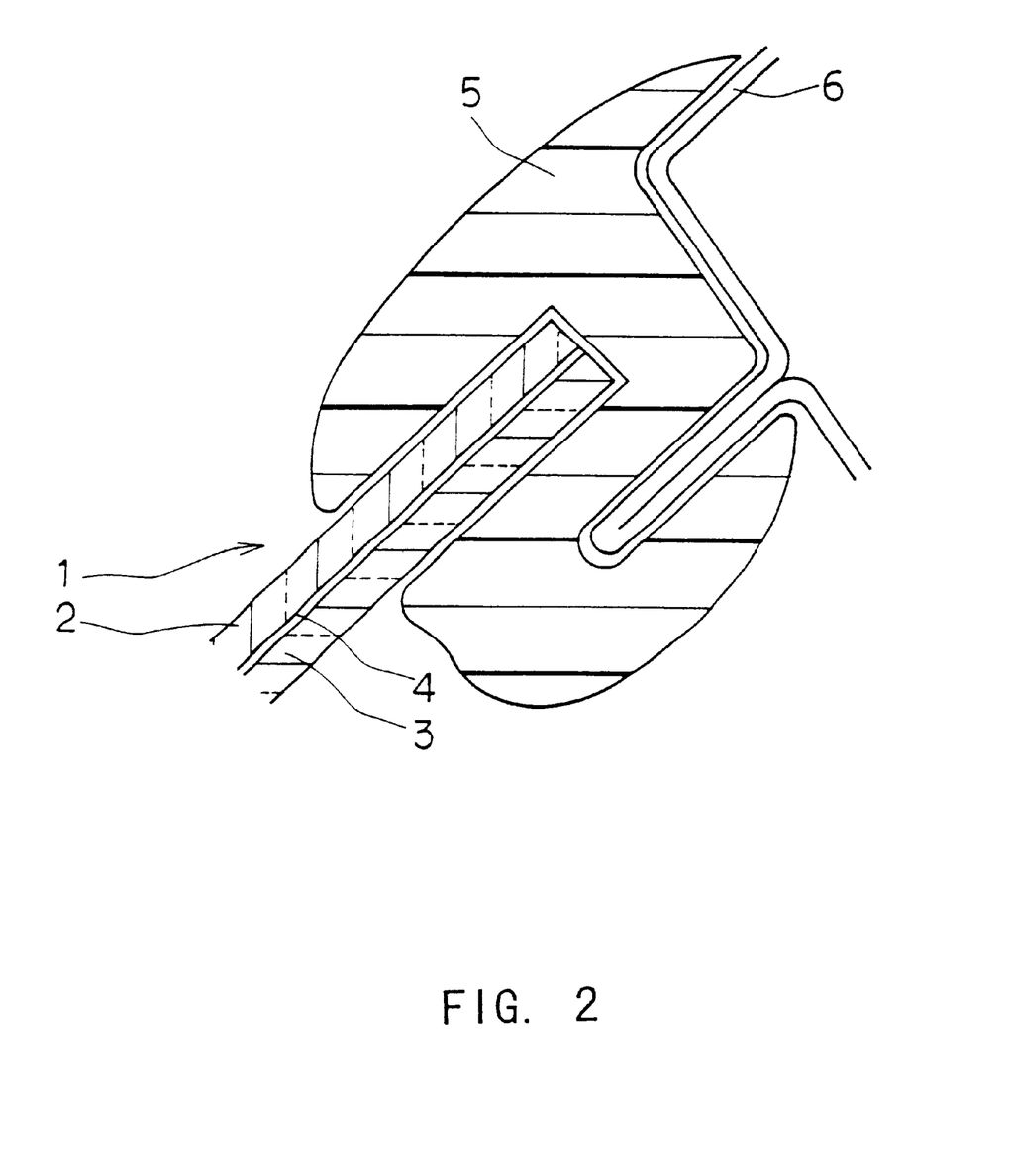
FIG. 2 is a cross-sectional view of an edge portion of an embodiment of the window of the present invention.

Next, using a first glass sheet that has the same tempering degree as this glass sheet, a laminated glass was manufactured by the above method. A PVB film was used as the intermediate film and tempered or non-tempered glass sheets having various thicknesses were used as the second glass sheet. This laminated glass was fitted in an automobile window, with the first glass sheet facing the interior side of the automobile, and a demolition and escape test using a commercial hammer for breaking glass was conducted from the interior of the automobile. A gasket 5 as shown in FIG. 2 was used as the window frame member for fitting the laminated glass 1 to fix the entire periphery of a rectangular laminated glass 1 to a window frame 6.

As a result of actually conducting the escape test from the interior side, it was found that when the second glass sheet 2 was a non-tempered glass sheet, the demolition and the dismantling of the second glass sheet were easy, while when the second glass sheet 2 was a tempered glass sheet having an excessively high strength, demolition in a short time through the PVB film 4 was difficult even if the first glass sheet 3 was broken granularly. As a result of testing glass sheets having various tempering degrees, the upper limit of the strength of the second glass sheet that was indicated by the residual tensile stress in the cross-sectional center similarly to the first glass sheet was 44 MPa for a thickness of 1.5 mm and 28 MPa for a thickness of 3.2 mm, and was approximately linear between 44 MPa and 28 MPa for thicknesses of 1.5 to 3.2 mm.

Figure 1:
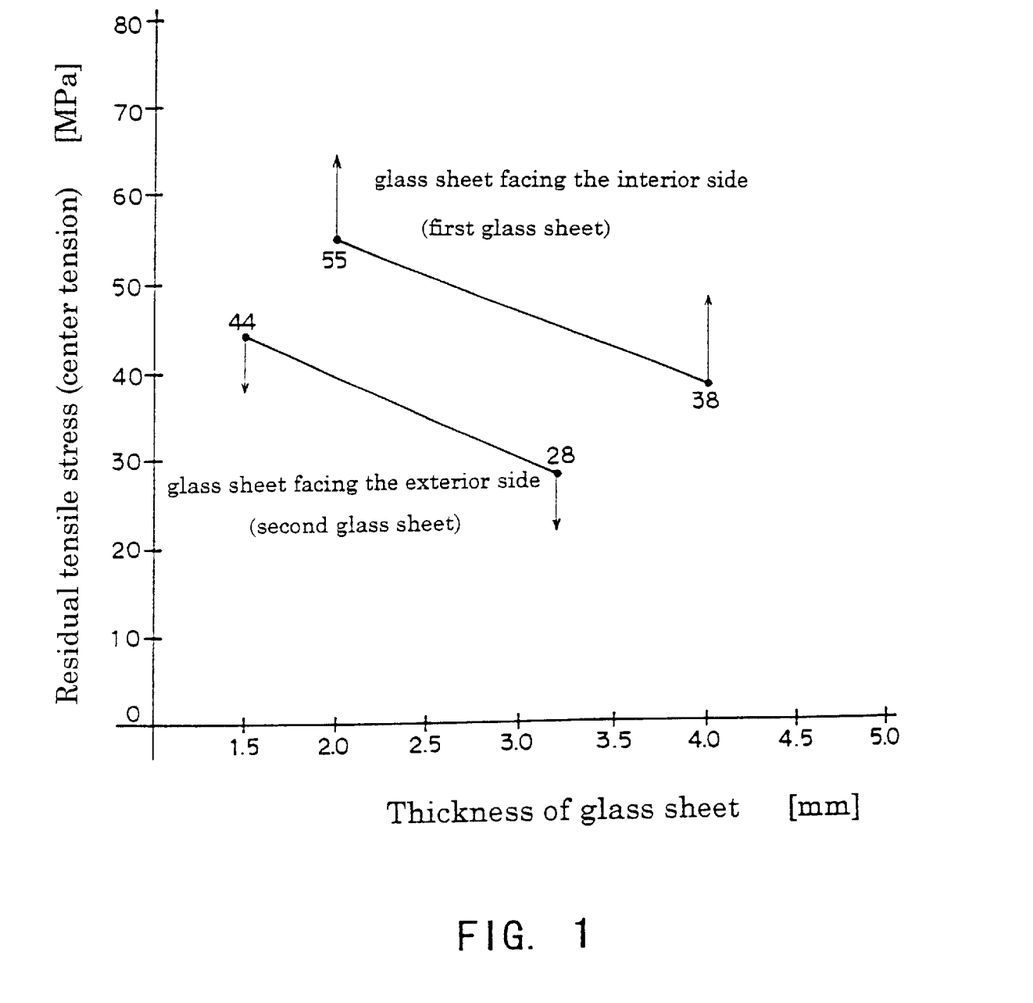
FIG. 1 shows the preferred ranges of the thickness and the center tensile stress of the glass sheet that faces the interior side or the exterior side for forming a laminated glass of the present invention.

From the above results, the preferred ranges of the thickness and the internal tensile stress (residual central tensile stress) of the first glass sheet (the glass sheet facing the interior side) and the second glass sheet (the glass sheet facing the exterior side) are summarized in FIG. 1.

Example 2

In view of the fact that breaking a laminated glass and dropping it out of the frame is required in an accident of an automobile falling into the water or the like, a window structure that permits easier demolition and easier escape was examined.

Figure 3:
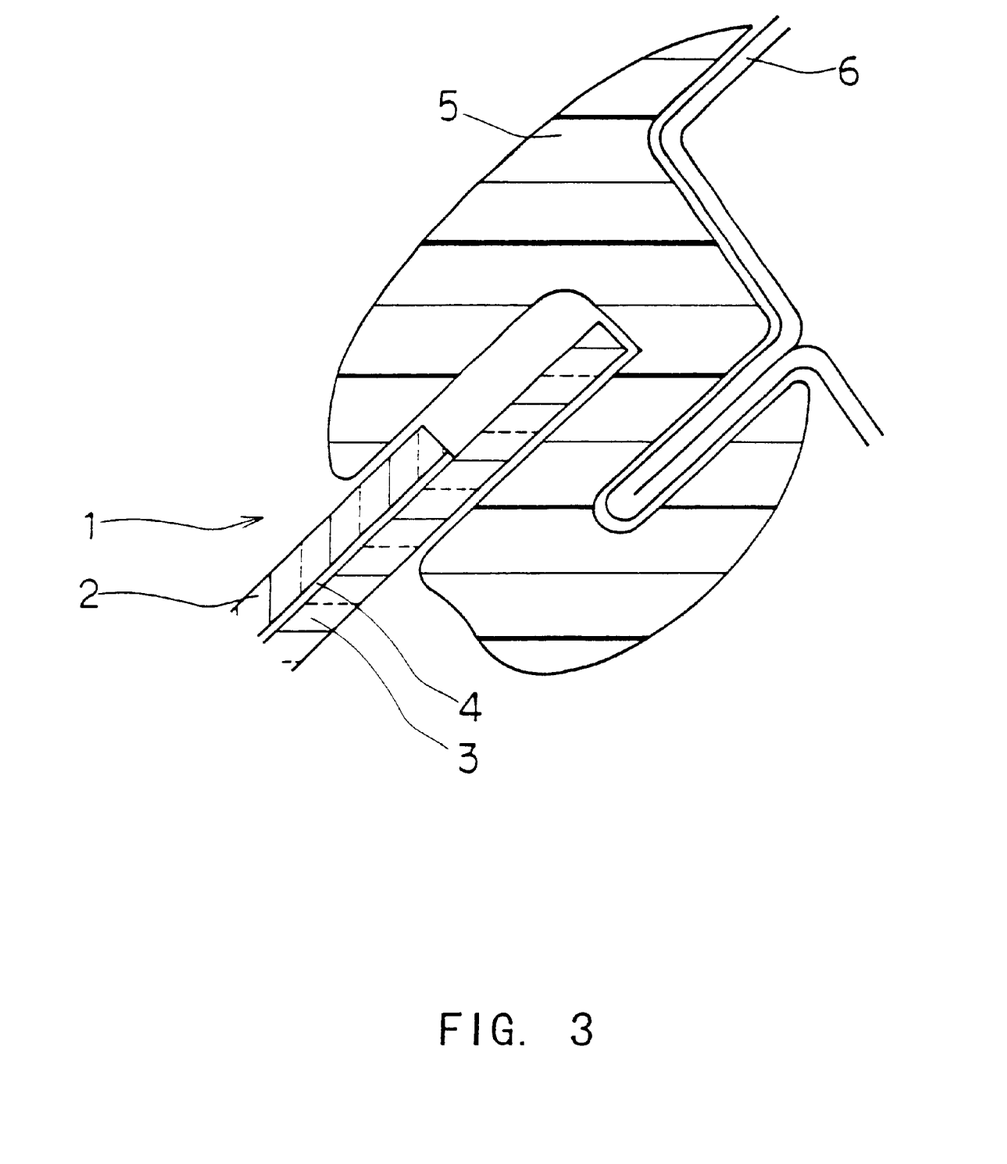
FIG. 3 is a cross-sectional view of an edge portion of another embodiment of the window of the present invention in which one of the glass sheets protrudes from the edge of the laminated glass.

First, a window structure, in which the first glass sheet 3 facing the interior side was made lager than the second glass sheet 2 facing the exterior side to provide a step at an edge of a laminated glass 1, was manufactured as shown in FIG. 3. This window structure is the same as the structure shown in FIG. 2 in that the first and second glass sheets were inserted in and held by a gasket 5 and is different in that the extent of insertion into the recess portion of the gasket required for fixing the glass was substantially ensured by the first glass sheet 3. When the first glass sheet 3 of such a window structure was broken with a hammer for breaking glass so that the entire glass sheet was broken into small pieces, the second glass sheet 2 was easily dropped out of the gasket along with a PVB film 4 by pushing the second glass sheet 2 from the interior side and slightly deforming it, without breaking it.

Figure 4:
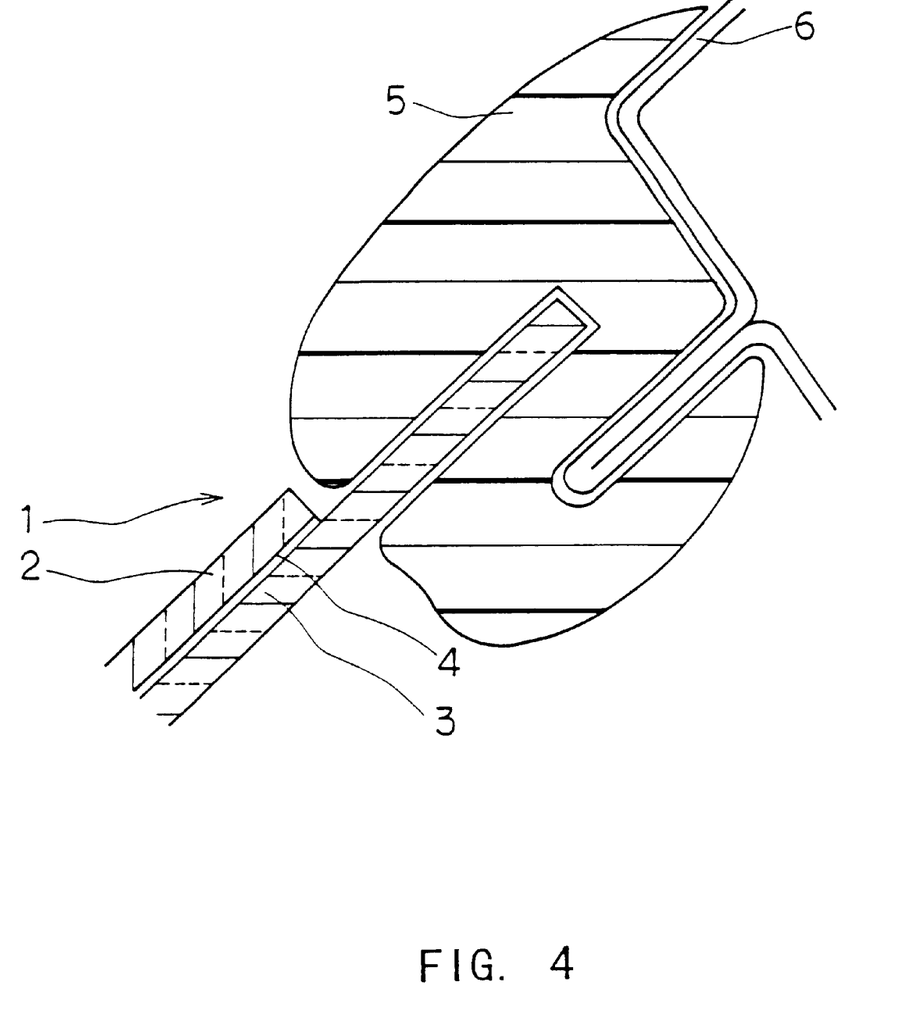
FIG. 4 is a cross-sectional view of an edge portion of still another embodiment of the window of the present invention in which one of the glass sheets protrudes from the edge of the laminated glass.

Thus, in a window structure, in which the first glass sheet 3 of the laminated glass is substantially supported, the laminated glass was dropped without necessarily breaking the second glass sheet 2. In this case, the thickness and the strength of the second glass sheet are not limited to a specific thickness and a specific strength in view of making the escape from the window easier. However, in view of the entire weight and the like, it is preferred for practical use that the thickness is in the range of 1.5 to 3.2 mm, similar as above. Also, similar effects were obtained for a structure in which an edge of the second glass sheet 2 is not inserted in the recess portion of the gasket as shown in FIG. 4.

Figure 5:
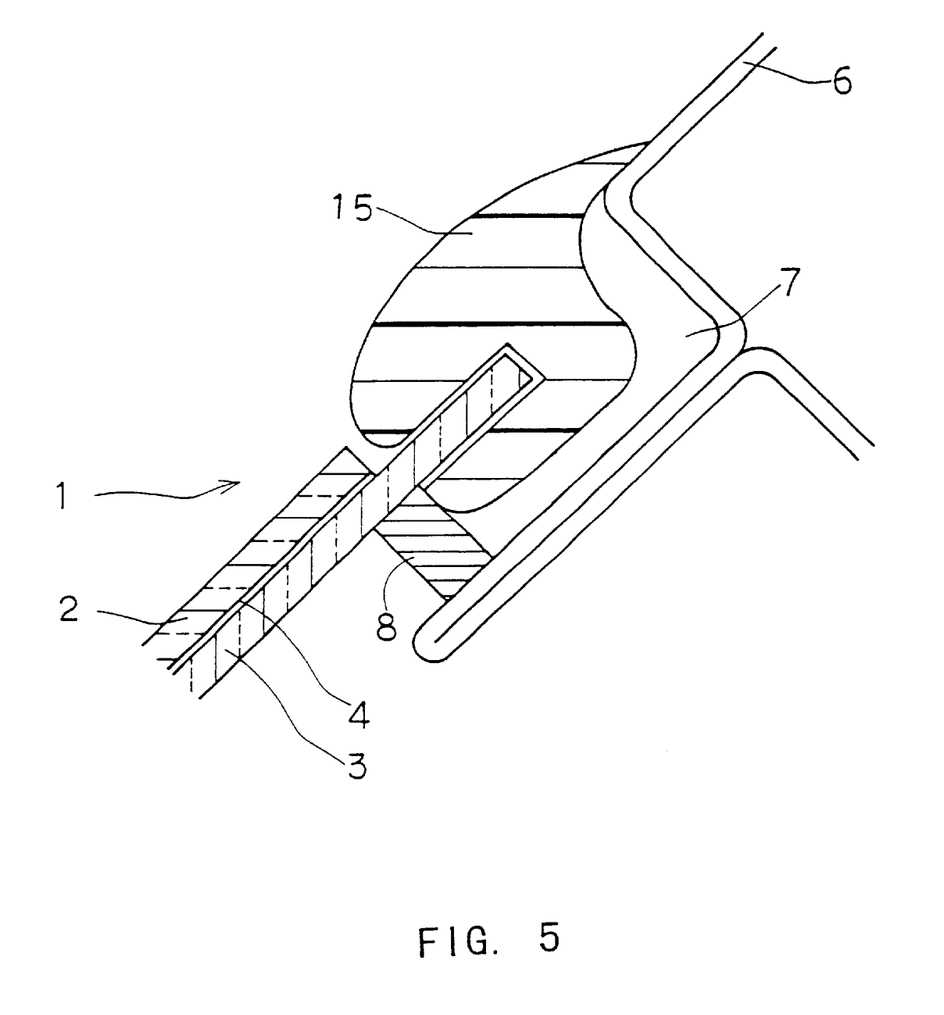
FIG. 5 is a cross-sectional view of an edge portion of still another embodiment of the window of the present invention in which one of the glass sheets protrudes from the edge of the laminated glass.

While the window using the gasket is illustrated above, other windows also can be composed with the laminated glass. As shown in FIG. 5, a window called a modular window can be composed of a laminated glass 1 with a supportive member 15 of thermoplastic resin such as polyvinyl chloride. In such a window, the laminated glass 1 is fixed with an adhesive 7 and a dam 8 to a window flame 6. The supportive member 15 is previously formed at an edge of the glass by an injection molding method.

Figure 6:
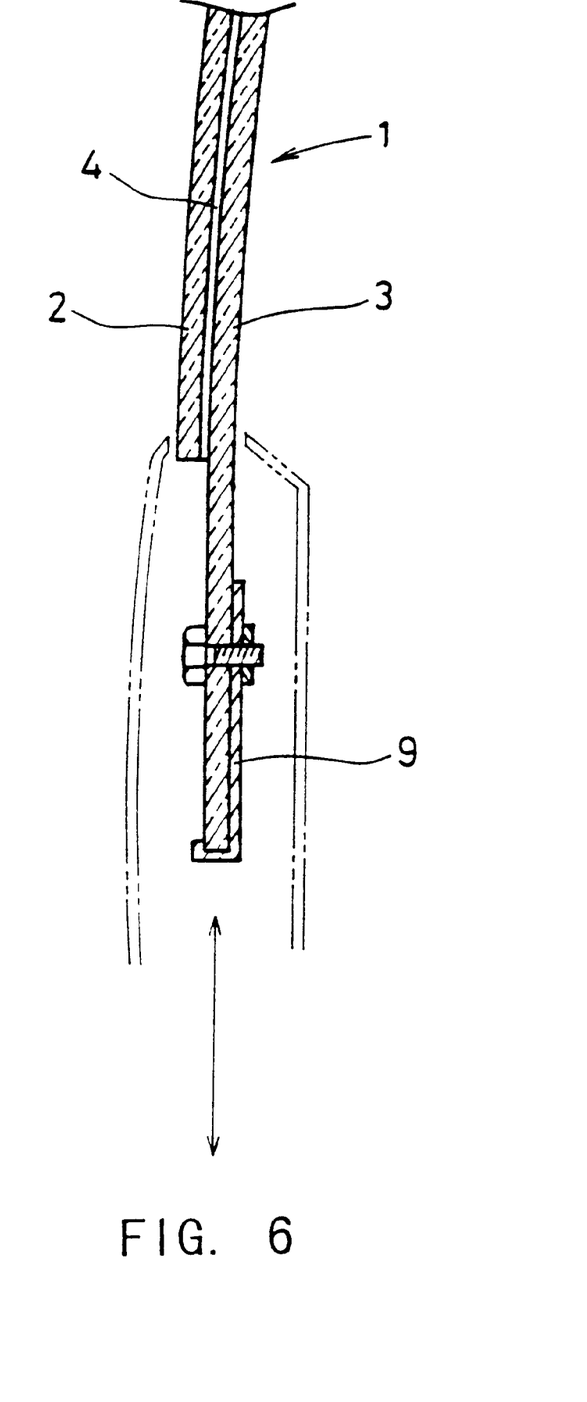
FIG. 6 is a cross-sectional view of a lower edge portion of an embodiment of the window of the present invention for an automobile door.

As shown in FIG. 6, inside an automobile front door, a glass fixing member 9 and a first glass sheet 3 were fixed to each other by utilizing the step structure of a laminated glass 1 to connect the laminated glass 1 and a device for raising and lowering the glass (a regulator) not shown. FIG. 6 shows the state in which the glass sheet is raised and the window is completely closed. In this state, the size of the second glass sheet 2 is adjusted so that an edge of the second glass sheet 2 is shallowly inserted inside the door. The escape test from the side of the first glass sheet 3 (from the interior side of the automobile) was carried out for the automobile window structure in such a state, similarly to the above. When the first glass sheet 3 was broken into many small pieces, the lower edge of the second glass sheet 2 was easily dropped out of the door without breaking the second glass sheet 2. Such a window structure also can be applied to other windows such as an automobile rear window glass.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. An automobile side window comprising:

a laminated glass mounted in a window frame, the laminated glass comprising a first glass sheet, a second glass sheet and an intermediate film for bonding the first glass sheet and the second glass sheet, wherein the first glass sheet is a tempered glass in which, by breaking the first glass sheet at one point with a tool for breaking glass, cracks spread spontaneously from the point so that a crack network is formed in the first glass sheet, and wherein the first glass sheet faces an interior of an automobile and the second glass sheet faces an exterior side of the automobile, and an edge of the first glass sheet protrudes beyond an edge of the second glass sheet, and the second glass sheet has a lower strength than the first glass sheet, whereby a person in the automobile who can break the first glass sheet, with the tool can escape from the interior of the automobile through the side window.

2. An automobile side window according to claim 1, wherein the second glass sheet has a thickness of 1.5 mm to 3.2 mm.

3. An automobile side window according to claim 1, wherein the first glass sheet has a thickness of 2.0 mm to 4.0 mm.

4. An automobile side window according to claim 1, wherein the laminated glass satisfies the following equations:

$$F_1 \geq -8.5(t_1-2.0)+55,$$

$$2.0 \leq t_1 \leq 4.0,$$

$$F_2 \leq -9.41(t_2-1.5)+44,$$

and $$1.5 \leq t_2 \leq 3.2,$$

where $t_1$ (mm) is the thickness of the first glass sheet, $F_1$(MPa) is the residual tensile stress in a cross-sectional center of the first glass sheet, $t_1$(mm) is the thickness of the second glass sheet, and $F_2$(MPa) is the residual tensile stress in a cross-sectional center of the second glass sheet.

5. An automobile side window according to claim 1, wherein the laminated glass is supported by said window frame substantially only with the first glass sheet at least for a part of a peripheral portion of the laminated glass.

6. An automobile side window according to claim 1, wherein the side window is in a door of the automobile.

7. A door for an automobile comprising:

a door frame including a glass fixing member;

a side window mounted on the door frame, the side window comprising a laminated glass that includes a first glass sheet, a second glass sheet and an intermediate film for bonding the first glass sheet and the second glass sheet, wherein the first glass sheet is a tempered glass in which, by breaking the first glass sheet at one point with a tool for breaking glass, cracks spread spontaneously from the point so that a crack-network is formed in the first glass sheet, and wherein, in use, the first glass sheet faces an interior side of the automobile and the second glass sheet faces an exterior side of the automobile, and an edge of the first glass sheet protrudes beyond an edge of the second glass sheet, and the edge of the first glass sheet is fixed to said glass fixing member, and the second glass sheet has a lower strength than the first glass sheet, whereby a person in the automobile upon which the door is mounted who can break the first glass sheet with the tool can escape from the interior of the automobile through the side window.

8. A door for an automobile according to claim 7, wherein the second glass sheet has a thickness of 1.5 mm to 3.2 mm.

9. A door for an automobile according to claim 7, wherein the first glass sheet has a thickness of 2.0 mm to 4.0 mm.

10. A door for an automobile according to claim 7, wherein the laminated glass satisfies the following equations:

$$F_1 \geq -8.5(t_1-2.0)+55,$$

$$2.0 \leq t_1 \leq 4.0,$$

$$F_2 \leq -9.41(t_2-1.5)+44,$$

and $$1.5 \leq t_2 \leq 3.2,$$

where $t_1$(mm) is the thickness of the first glass sheet, $F_1$(MPa) is the residual tensile stress in a cross-sectional center of the first glass sheet, $t_2$(mm) is the thickness of the second glass sheet, and $F_2$(MPa) is the residual tensile stress in a cross-sectional center of the second glass sheet.

11. A door for an automobile according to claim 7, wherein the laminated glass is supported substantially only with the first glass sheet at least for a part of a peripheral portion of the laminated glass.

* * * * *

UNITED STATES PATENT AND TRADEMARK OFFICE
CERTIFICATE OF CORRECTION

PATENT NO.     : 6,361,101 B1
DATED          : March 26, 2002
INVENTOR(S)    : Yoshizawa It is certified that error appears in the above-identified patent and that said Letters Patent is hereby corrected as shown below:

<u>Title page,</u>
Item [30], Foreign Application Priority Data, "Oct. 7, 1999" should read -- Oct. 7, 1997 --

Signed and Sealed this

First Day of June, 2004

JON W. DUDAS
*Acting Director of the United States Patent and Trademark Office*